United States Patent
Morrison et al.

[11] 3,949,658
[45] Apr. 13, 1976

[54] POTATO CHIP MAKER

[75] Inventors: Howard J. Morrison, Deerfield; Robert K. Allen, Frankfort, both of Ill.

[73] Assignee: Marvin Glass & Associates, Chicago, Ill.

[22] Filed: July 24, 1974

[21] Appl. No.: 491,355

[52] U.S. Cl. ................... 99/341; 99/443 C; 99/386
[51] Int. Cl.² ..................................... A47J 37/08
[58] Field of Search ............. 99/386, 341, 385, 391, 99/393, 401, 404, 427, 443, 446; 46/40; 426/355, 466

[56] References Cited
UNITED STATES PATENTS

| | | | |
|---|---|---|---|
| 1,051,503 | 1/1913 | Klein | 99/446 |
| 1,708,522 | 4/1929 | Pross, Jr. | 99/341 X |
| 1,725,521 | 8/1929 | Keiner | 99/446 UX |
| 2,454,370 | 11/1948 | Beaubien | 99/386 UX |
| 2,472,293 | 6/1949 | Groven | 99/386 UX |
| 2,504,110 | 4/1950 | Davis et al. | 99/386 X |
| 2,678,717 | 5/1954 | Lucas | 46/40 X |
| 3,427,171 | 2/1969 | Jeppson | 99/443 C X |
| 3,649,042 | 8/1953 | Wickman | 99/441 |
| 3,677,171 | 7/1972 | LeVan | 99/443 C X |

*Primary Examiner*—Robert L. Bleutge
*Assistant Examiner*—Arthur O. Henderson
*Attorney, Agent, or Firm*—Coffee & Sweeney

[57] ABSTRACT

A toy potato chip maker for producing dry cooked potato chips which includes a cooking chamber with openings in opposite walls of the cooking chamber to provide a substantially horizontally alined passageway through the chamber. A continuous screen-type conveyor is mounted on a pair of rollers on either side of the cooking chamber so that prepared slices of potatoes can be moved either stepwise, successively through, or continuously through the cooking chamber, and out of the cooking chamber by hand rotation of a crank on one of the rollers. Lightbulbs are located in the cooking chamber, both above and below the passageway, to create radiant heat for cooking the potato chips which are moved by the screen through the cooking chamber. A novel potato slicer also is provided.

1 Claim, 5 Drawing Figures

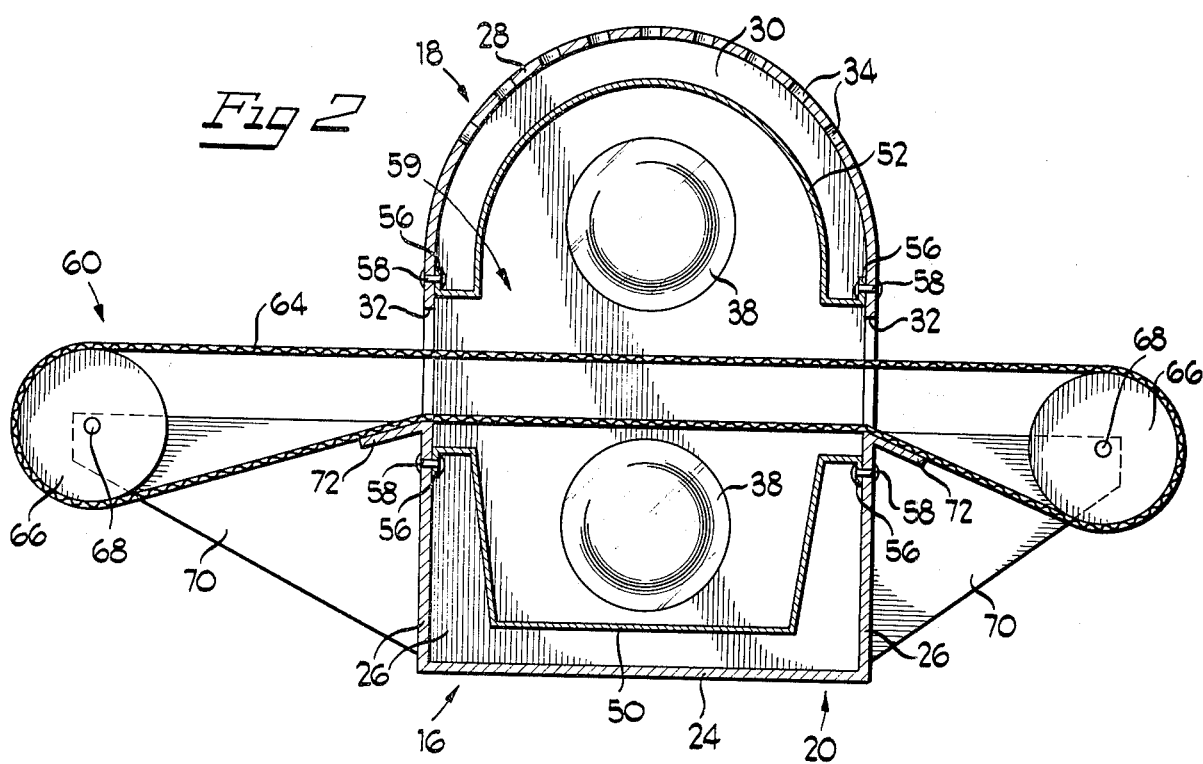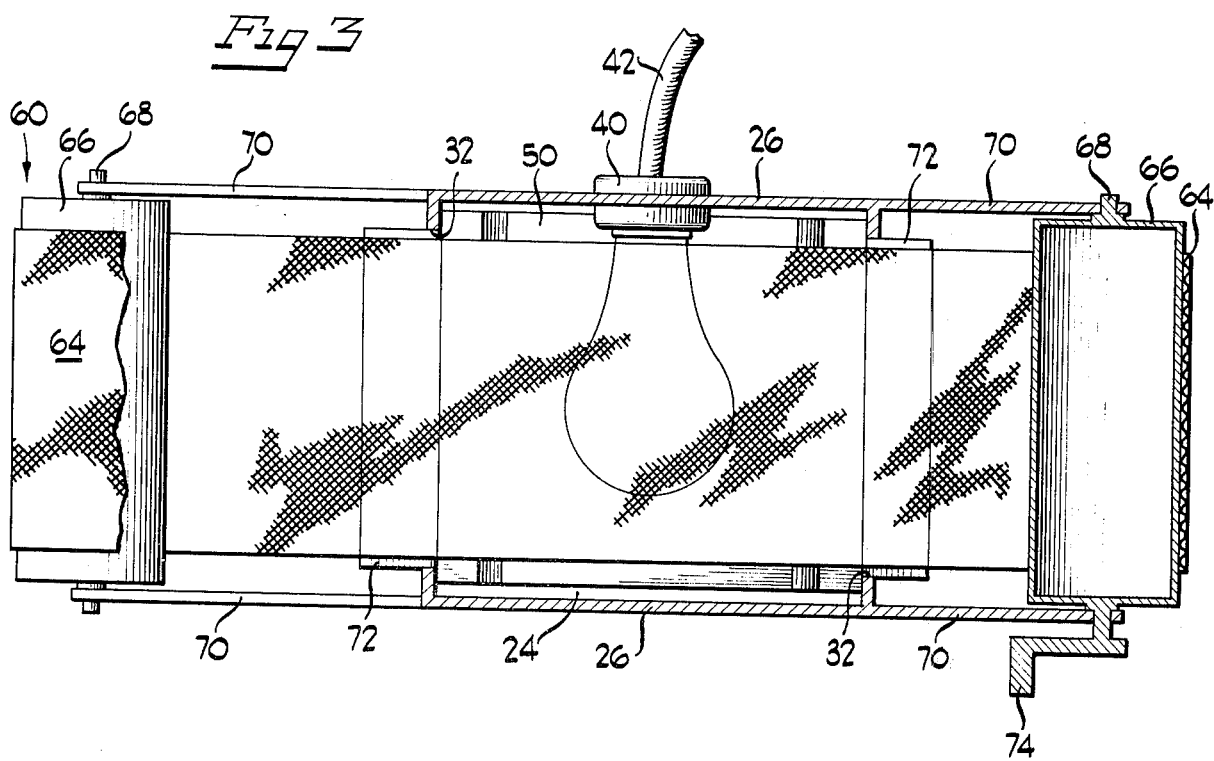

POTATO CHIP MAKER

BACKGROUND AND SUMMARY OF THE INVENTION

This invention relates to toys and is directed particularly to a toy potato chip maker in which a child may produce potato chips without the danger of using hot oil, as in commercial processes.

An object of the invention is to provide a novel, fully operative potato chip maker that is safe for a child to operate. Toward this end, the heating chamber is heated by ordinary lightbulbs which are shielded from contact by the child. The temperature generated by these lightbulbs is found to be adquate for this purpose and is not so great that it cannot be effectively baffled and vented so that there is no danger of the child being burned by touching any of the exposed parts of the heating chamber.

The exemplary embodiment of the invention generally includes a slicer for producing thin segments of potatoes, and a cooking apparatus for making the potato chips. The cooking apparatus includes an upper and lower housing portion and a pair of incandescent lamps, one of which is located in each housing portion. A pair of reflectors, one in the upper housing portion and one in the lower housing portion, provide a heating chamber for heat generated by the lamps. An endless screen conveyor encircles a pair of rollers outside opposite ends of the heating chamber such that the screen will move through the heating chamber between the lamps. A manually rotatable hand crank is secured to one of the rollers to permit selective manual movement of the screen through the housing.

Other objects, features and advantages of the invention will become apparent from the following detailed description taken in connection with the accompany drawings.

BRIEF DESCRIPTION OF THE DRAWINGS

FIG. 2 is a vertical section, on an enlarged scale, taken generally along the line 2—2 of FIG. 1;

FIG. 3 is a horizontal section, on an enlarged scale, taken generally along the line 3—3 of FIG. 1;

BRIEF DESCRIPTION OF THE PREFERRED EMBODIMENT

Figure 1:
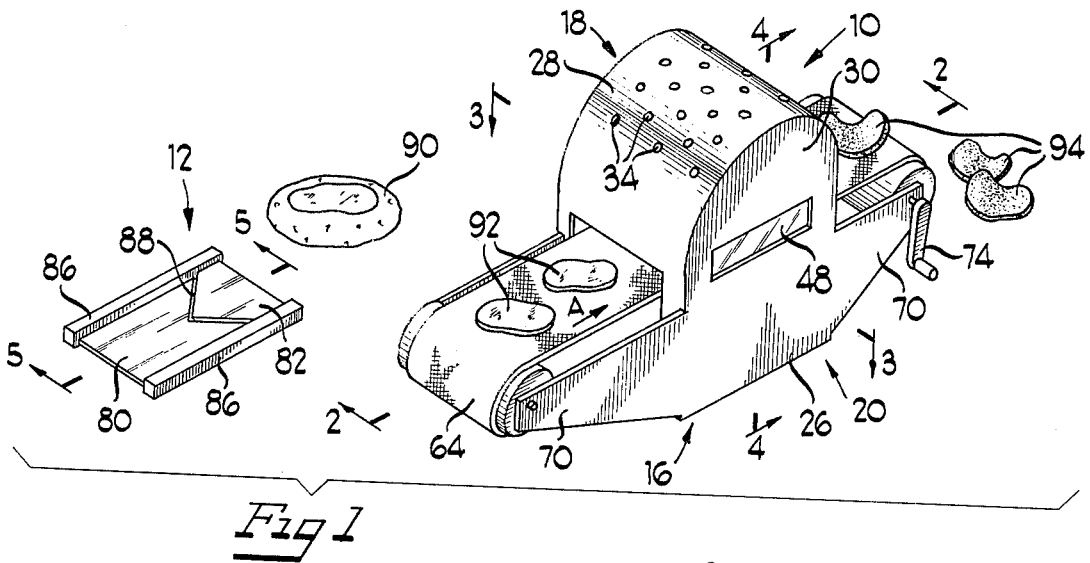
FIG. 1 is a perspective view of the potato chip maker and slicer of the present invention.

An exemplary embodiment of the invention is shown in FIG. 1, including a toy potato chip maker, generally designated 10, and a potato slicer, generally designated 12. The toy potato chip maker includes a housing, generally designated 16, having a curved, semi-circular generally hollow upper portion, generally designated 18, and a rectangular generally hollow lower portion, generally designated 20. The housing portions 18 and 20 preferrably are molded of a heat and impact resistent plastic material to provide a safe toy for a child's use.

Looking now to FIG. 2, the upper housing portion 18 can be molded integrally with the lower housing portion 20, as shown. The lower housing portion 20 includes a base 24 and four generally rectangular side walls 26. The upper housing portion 18 includes a semi-circular upper wall 28 and two side walls 30 which conform to the shape of the upper wall 28 and may be integrally molded with the side walls 26 of the lower housing portion. Two generally horizontally directed rectangular openings 32 are provided between the lower housing walls 26 and the curved upper housing wall 28 to provide ingress and egress to the interior thereof. A plurality of apertures 34 are provided in the uppermost portion of the curved wall 28 to provide for the escapement of air from within the housing portions 18 and 20.

Figure 4:
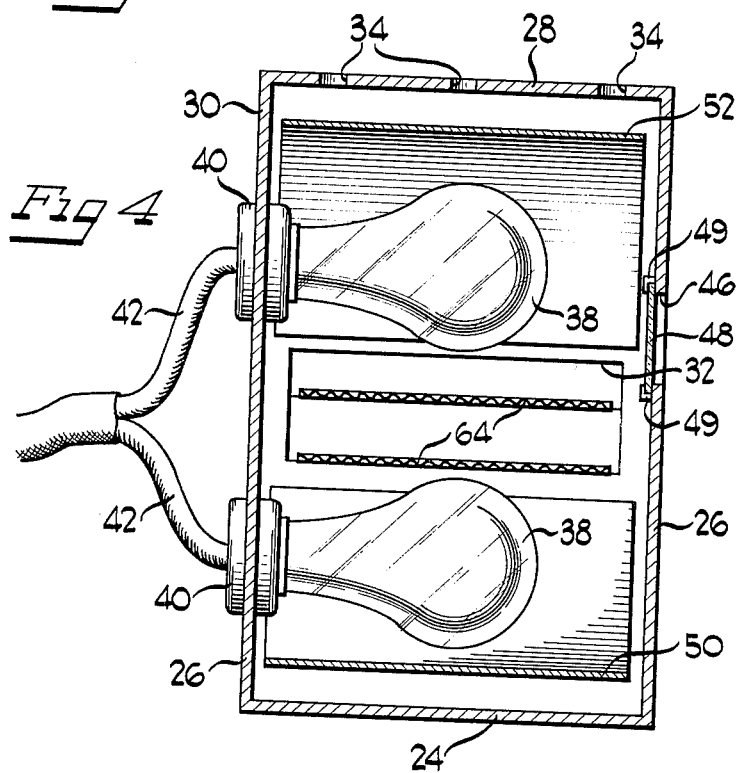
FIG. 4 is a vertical section, on an enlarged scale, taken generally along the line 4—4 of FIG. 1.

A pair of incandescent lamps 38 are provided within the interior of the upper housing portion 18 and the lower housing portion 20 (FIGS. 2 and 4). The incandescent lamps 38 are mounted in bases or sockets 40 which are secured within openings in the walls 30 and 26 of the upper and lower housing portions 18 and 20, respectively. The bases 40 are connected by standard wire leads 42 to a conventional (120 volt) current source (FIG. 4).

On the wall 30, opposite the wall which mounts the lightbulbs, another generally horizontal rectangular opening 46 (FIG. 4) is provided for viewing the interior of the housing portions. A transparent plastic heat resistent shield 48 is secured within the opening 46 for safety by a pair of L-shaped flanges 49.

Referring again to FIG. 2, a pair of metal, heat reflecting and insulating shields 50 and 52 are secured within the lower and upper housing portions, respectively. The heat shields 50 and 52, generally follow the outline of the respective housing portions and are spaced therefrom, except at the end portions where flanges 56 on each metal shield, are secured to the housing portions by rivets 58. The heat reflecting and insulating shields 50 and 52 thereby form a heating chamber, generally designated 59, within the housing portions 18 and 20 and generally reflect and direct the heat and light created by the incandescent lamps 38 toward a plane generally within the area defined by the rectangular openings 32.

Conveyor means, generally designated 60, is provided in the form of an endless screen or chain link conveyor belt 64, as seen in FIGS. 2, 3 and 4. The screen 64 is stretched around two rollers 66 outside opposite ends of the heating compartment in line with the rectangular openings 32. The rollers 66 each include a central shaft 68 which is rotatably mounted in a pair of flanges 70 mounted on opposite ends of the lower housing portion 20 in line with the direction of the conveyor means 60.

A manually rotatable handle or crank 74 is secured to the shaft 68 of the righthand roller, as seen in FIG. 1, to move the conveyor through the compartment. It also is contemplated that an electric motor could be used to drive the conveyor 60 at a relatively slow speed. Two flanges 72 (FIG. 3) are provided at the lower edge of the rectangular openings 32, and are secured to the lower housing walls 26, to guide the endless screen 64 through the heating compartment. The bottom portion of the conveyor is spaced from the upper portion of the conveyor at a distance substantially less than the diameter of the rollers 66. This arrangement allows for positioning of the lower incandescent lamp 38 substantially closer to the top portion of the endless screen 64.

Figure 5:
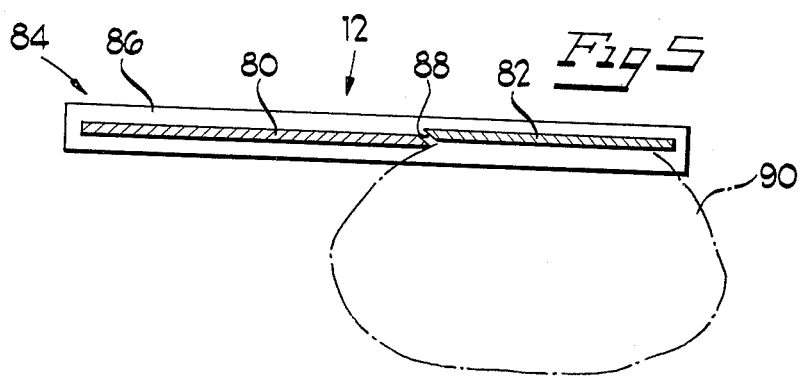
FIG. 5 is a vertical section of the slicer, on an enlarged scale, taken generally along the line 5—5 of FIG. 1.

Referring to the left of FIG. 1, a potato slicer is provided for slicing thin segments from potatoes 90 for use in the potato chip maker 10. Referring to FIG. 5, the slicer 12 includes a pair of rigid plates 80 and 82 which are mounted on a frame, generally designated 84. The frame 84 includes two side rails 86 securing the plates 80 and 82 in the offset position as seen in FIG. 5. The plates 80 and 82 have a transverse slot 88 adjacent the offset. The edges of each plate 80 and 82 are cut at an angle to enable the lower plate, as seen in FIG. 5, to shear off a slice of potato 90 causing it to go through the slot 88 and onto the top of the plate 80. In addition, the edges of the two plates are cut to form a V-shaped slot, as can be seen in FIG. 1.

In operation, the child places a number of potato slices 92 on the lefthand portion of the endless screen 64 as seen in FIG. 1. The hand crank 74 then is rotated to move the potato slices into the heating chamber through the left hand slot 32, in the direction of arrow A, where they are supported by the screen 64 for exposure to the heat radiating from the two lightbulbs 38. When it is observed through the plastic window 48 that the cooking is completed, the crank 74 again is rotated to move the potato chips out the opposite slot 32 (the right hand slot in FIGS. 1 and 2) and off of the conveyor. The cooking time for potato chips will be approximately 2 to 6 minutes when two 60-watt lightbulbs are used for heating. In this way a child may safely make delicious potato chips 94 without the use of expensive or dangerous equipment or very hot oil, or the like.

The foregoing detailed description has been given for clearness of understanding only and no unnecessary limitations should be understood therefrom as some modifications will be obvious to those skilled in the art.

We claim:

1. A potato chip producing device comprising, in combination:

a frame having a generally convex upper housing portion, a lower housing portion, horizontal passage means through opposite sides of the housing between said upper and lower housing portions, a pair of flanges protruding outwardly from said opposite sides of the housing exteriorly thereof providing for a pair of journal supports;

a pair of relatively low wattage incandescent lamps, one mounted in the upper housing portion and the other mounted in the lower housing portion;

a pair of generally convex reflectors, one in the upper housing portion between the upper lamp and the housing, the other in the lower housing portion between the lower lamp and the housing, providing a heating chamber within the housing in communication with said passage means, and a plurality of apertures in the top of the upper housing portion above the upper reflector to permit the escapement of heated air from within the housing;

an endless screen encircled about a pair of rollers rotatably mounted in said journal supports exteriorly of said housing and having upper and lower runs passing through said passage means and through said heating chamber;

guide means on said lower housing portion for contacting the lower run of said endless screen to reduce the distance between the upper run and the lower run of the screen within the heating chamber to an amount substantially less than the diameter of said rollers;

an aperture in the upper housing portion having a transparent, heat-resistant shield therein to provide means for viewing into the heating chamber; and a manually rotatable hand crank secured to one of said rollers to permit selective manual movement of said screen through the housing and the heating chamber whereby slices of potatoes may be positioned within the heating chamber for a sufficient amount of time to be cooked to form potato chips.

* * * * *